United States Patent [19]

van der Lely

[11] 4,127,176
[45] Nov. 28, 1978

[54] SOIL CULTIVATING IMPLEMENTS
[76] Inventor: Cornelis van der Lely, 7, Brüschenrain, Zug, Switzerland
[21] Appl. No.: 741,509
[22] Filed: Nov. 12, 1976
[30] Foreign Application Priority Data
Nov. 12, 1975 [NL] Netherlands .................. 7513215
[51] Int. Cl.² ................................ A01B 33/06
[52] U.S. Cl. .............................. 172/51; 172/59; 172/71
[58] Field of Search ............. 172/59, 51, 48, 50, 172/94, 84, 88, 63, 119, 123, 72, 51, 49
[56] References Cited
U.S. PATENT DOCUMENTS

| 1,279,689 | 9/1918 | Harmon | 172/72 |
| 2,526,396 | 10/1950 | Nowlin | 172/119 X |
| 2,787,943 | 4/1957 | Browning | 172/72 X |
| 3,638,539 | 2/1972 | Lewis | 172/59 |
| 3,774,689 | 11/1973 | Lely et al. | 172/112 |
| 3,945,441 | 3/1976 | Lely et al. | 172/51 |

Primary Examiner—Richard J. Johnson
Attorney, Agent, or Firm—Mason, Mason & Albright

[57] ABSTRACT

A cultivating implement includes a row of soil working members, such as tined rotors, and a driven soil crumbling member positioned at the rear of the cultivating tines. A driving transmission is interconnected to a rotatable bladed crumbling member or to supports which mount elongated, horizontally extending elements of a crumbling member, which elements are moved relative to the frame in non-horizontal directions to perform reciprocatory and/or vibratory movements. The crumbling member is driven to break up soil previously worked by the tines. The crumbling member is pivoted to the frame with forwardly extending arms and affords a rear support that can be set to regulate the working depths of the tines on the rotors. The transmission to the crumbling member is via the drive connections to the rotors which, in turn, are engaged by the p.t.o. of a tractor.

7 Claims, 5 Drawing Figures

SOIL CULTIVATING IMPLEMENTS

According to one aspect of the invention, there is provided a soil cultivating implement of the kind set forth, wherein one end of at least one shaft or the like which physically embodies the axis of rotation of a corresponding soil working or cultivating member is drivingly coupled to a transmission by which at least one tool to be used in combination with the implement can be operated from the power take-off shaft of a tractor or other operating vehicle to which the implement is connected in its use.

Figure 1:
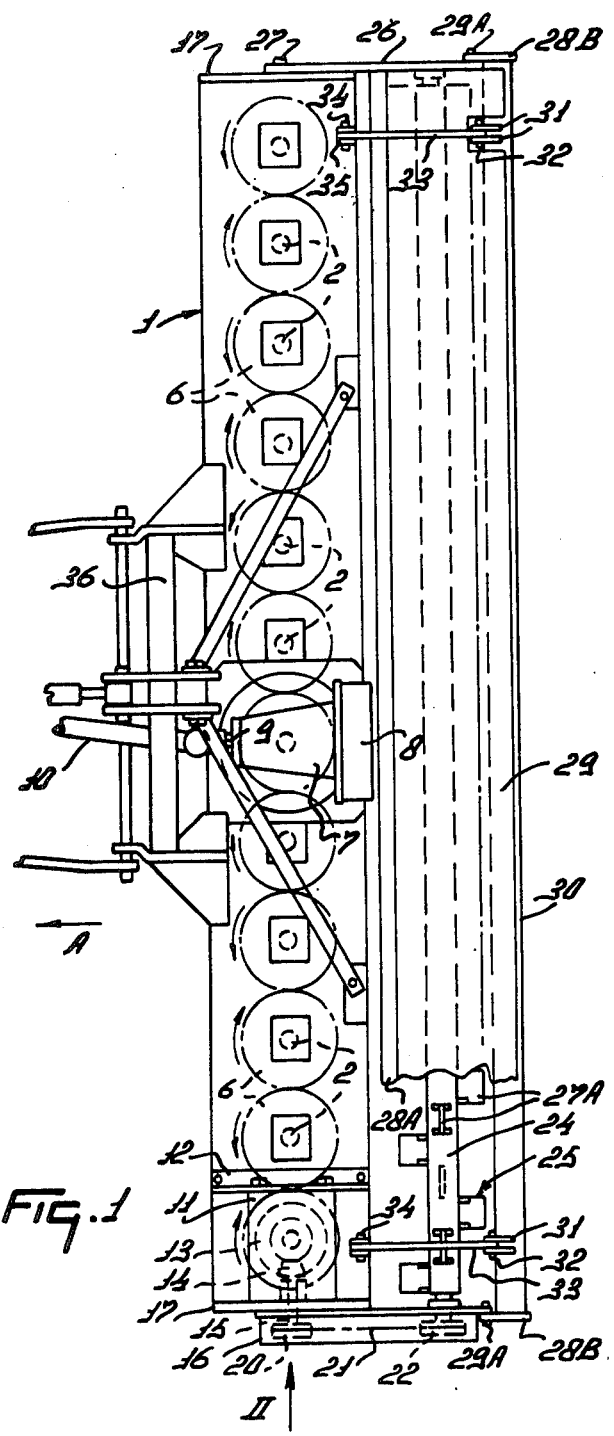
Figure 2:
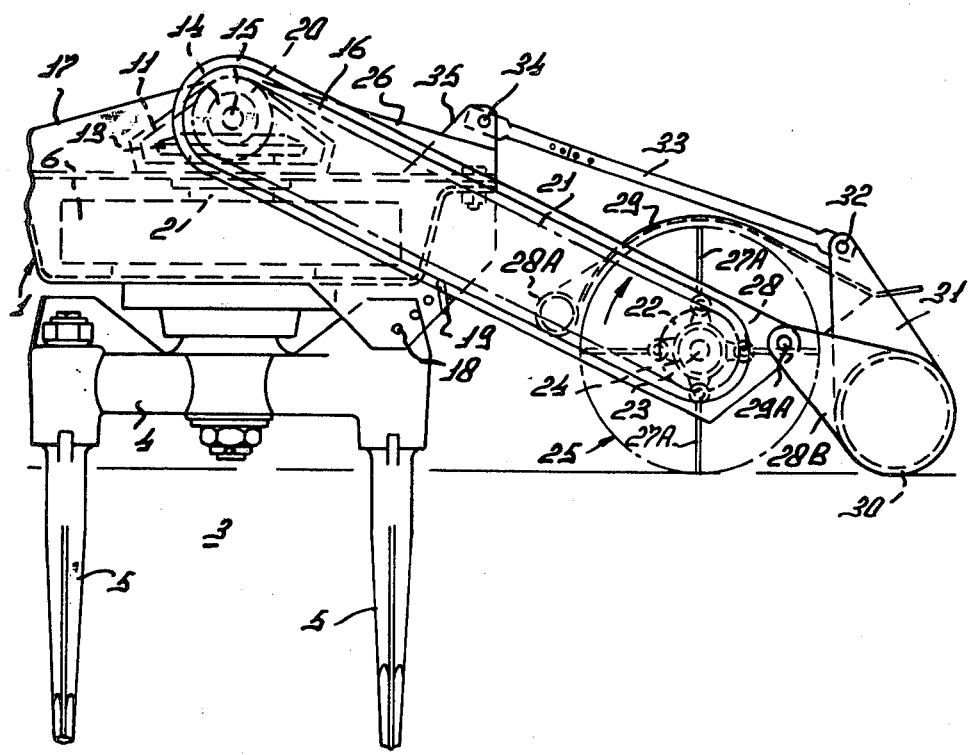
Figure 3:
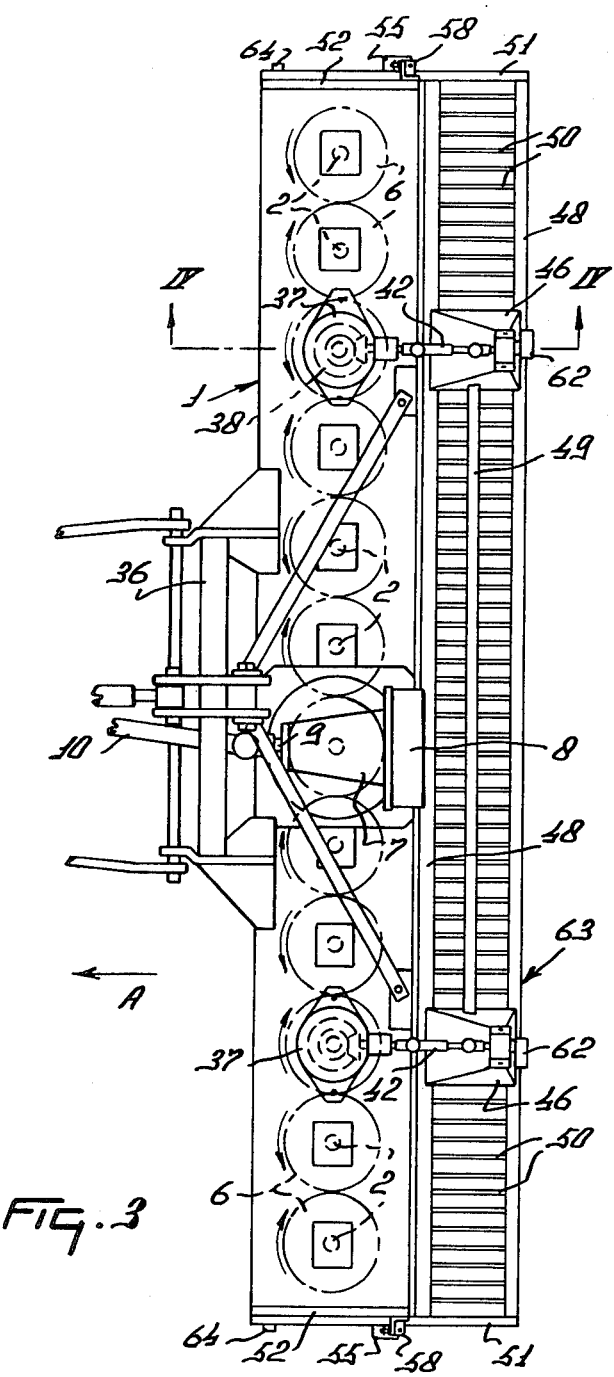
Figure 4:
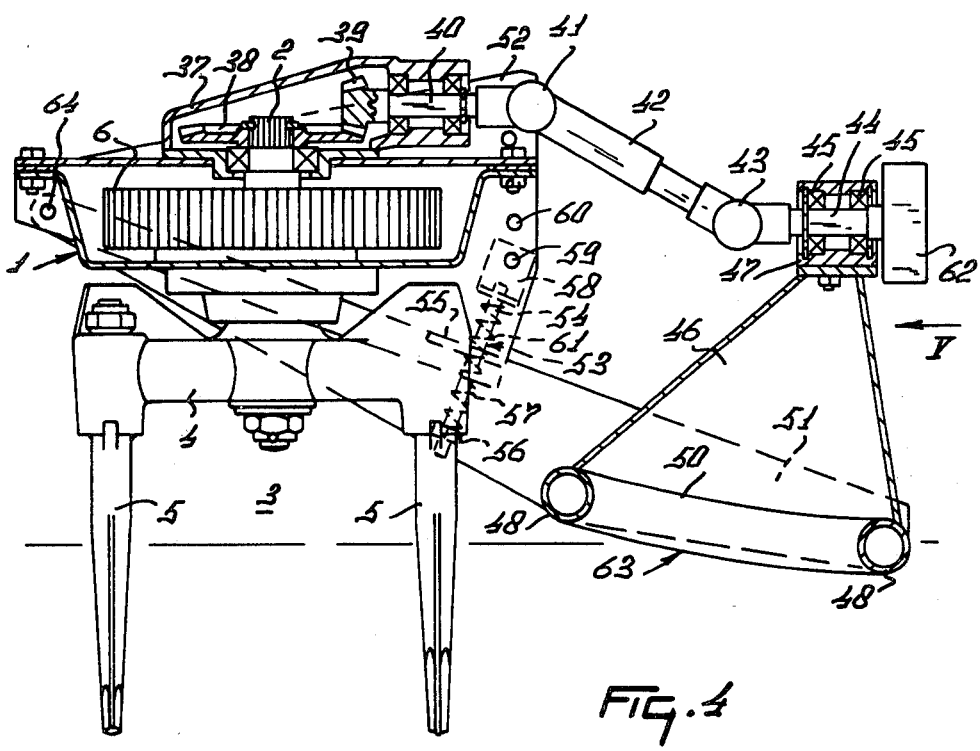
Figure 5:
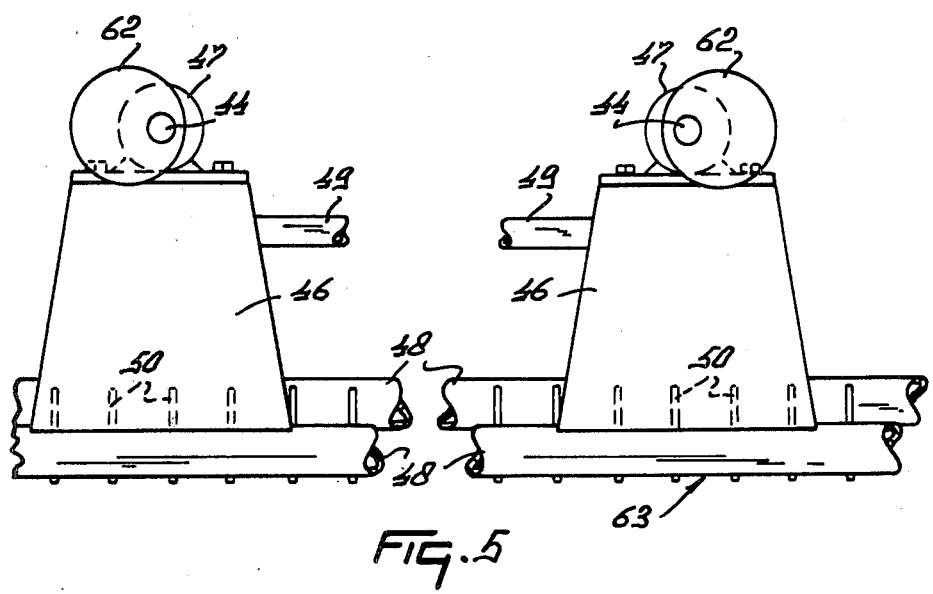

For a better understanding of the invention, and to show how the same may be carried into effect, reference will now be made, by way of example, to the accompanying drawings, in which:

FIG. 1 is a plan view of a soil cultivating implement in accordance with the invention in combination with a tool that is driven from said implement, the soil cultivating implement being connected to the rear of an agricultural tractor, FIG. 2 is a side elevation, to an enlarged scale, as seen in the direction indicated by an arrow II in FIG. 1, FIG. 3 is a plan view of an alternative form of soil cultivating implement in accordance with the invention in combination with a rear-mounted tool that is used in combination with said implement, the soil cultivating implement being connected to the rear of an agricultural tractor or other operating vehicle, FIG. 4 is a section, to an enlarged scale, taken on the line IV—IV in FIG. 3, and FIG. 5 is a rear elevation of parts of the combination of FIGS. 3 and 4 as seen in the direction indicated by an arrow V in FIG. 4.

Referring firstly to FIGS. 1 and 2 of the accompanying drawings, the soil cultivating implement that is illustrated therein has a hollow box-shaped frame portion 1 that extends substantially horizontally transverse, and usually substantially horizontally perpendicular, to the intended direction of operative travel of the implement that is indicated in FIG. 1 by an arrow A and similarly in FIG. 3 in respect of the alternative embodiment that will be described below. A plurality (in this case, twelve) of substantially vertical or at least upwardly extending shafts 2 are rotatably mounted in bearings carried by the upper and lower walls of the hollow frame portion 1 so as to extend in a single row that is parallel to the transverse length of the frame portion 1 and thus perpendicular or substantially perpendicular to the direction A. The axes of rotation of the shafts 2 are spaced apart from one another at regular intervals and it is preferred, but is not essential, that said intervals should have magnitudes of substantially 25 centimeters. The lowermost end of each shaft 2 projects downwardly from beneath the bottom of the hollow frame portion 1 and is there splined or otherwise keyed so as firmly, but releasably, to receive a matchingly splined or keyed hub at the center of a corresponding horizontally or substantially horizontally disposed tine support 4. The opposite outer ends of each tine support 4 are furnished with substantially cylindrical sleevelike tine holders whose axes are parallel or substantially parallel to the axis of the corresponding shaft 2. Each tine holder firmly but releasably receives the fastening portion of a corresponding rigid soil working tine 5, each tine 5 having a soil working portion that projects downwardly into the soil from its integral junction with the corresponding fastening portion with the axes of those two substantially straight portions inclined to one another in such a way that the soil working portion trails rearwardly from top to bottom by a few degrees with respect to the intended direction of operative rotation of the corresponding shaft 2. Each support 4 together with the corresponding tine holders and tines 5 forms a corresponding rotary soil working or cultivating member that is generally indicated by the reference 3 and it is noted that the intended directions of operative rotation of the shafts 2 and members 3 are indicated by small arrows in FIG. 1 of the drawings. It can be seen in FIG. 4 of the drawings that the tops of the tine supports 4 and their tine holders integrally or rigidly carry shield plates which are located in front of fastening nuts for the tines 5 with respect to the intended directions of rotation of the members 3, said shield plates protecting the fastening nuts from damage by stones or the like that may be met with in the soil during operation of the implement.

Each shaft 2 is provided, inside the hollow frame portion 1, with a corresponding straight-toothed or spur-toothed pinion 6, the magnitude and arrangement of said pinions 6 being such that the teeth of each pinion are in mesh with those of its neighbour, or with those of both of its neighbours, in the single row of 12 pinions 6. One of the center pair of shafts 2 of the row of 12 shafts has an upward extension through the top of the hollow frame portion 1 into a gear box 7 that is fastened in position on top of the frame portion 1. Bevel pinions (not visible) within the gear box 7 place the shaft extension in driven connection with a substantially horizontal shaft (not visible) that extends substantially parallel to the direction A. The rearmost end of the substantially horizontal shaft and the rearmost end of an overlying and parallel substantially horizontal shaft 9 both project through a rear wall of the gear box 7 into a change-speed gear 8 that is fastened to the back of said gear box. It is not necesssary to describe the construction of the change-speed gear 8 in detail for the purposes of the present invention but, briefly, the ends of the shaft 9 and the underlying and parallel shaft that project into the change-speed gear are both splined for co-operation with the matchingly splined hubs of a chosen pair of one of a number of pairs of co-operating exchangeable and interchangeable straight-toothed or spu-toothed pinions of different sizes. The particular pair of toothed pinions that is chosen, and the arrangement thereof that is adopted relative to the shaft ends that project into the change-speed gear 8, dictates the transmission ratio between the shaft 9 and the underlying and parallel shaft that is not visible in the drawings and thus the speed at which the soil working or cultivating members 3 will be revolved in response to a more or less fixed input speed of rotation that is applied to the leading splined or otherwise keyed end of the shaft 9 that projects forwardly from the front of the gear box 7 in a direction substantially parallel to the direction A. As shown in outline in FIG. 1 of the drawings, the leading end of the shaft 9, which affords a rotary input shaft of the gear box 7, is intended to be placed in driven connection with the power take-off shaft of an agricultural tractor or other operating vehicle through the intermediary of a telescopic transmission shaft 10, that is of a construction which is known per se, having universal joints at its opposite ends.

The shaft 2 that corresponds to the soil working or cultivating member 3 that is located at one end of the row thereof has a short upward extension through the top to the hollow frame portion 1, said extension projecting into a gear box 11. The shaft extension is provided, inside the gear box 11, with a large bevel pinion 13 whose teeth are in driving mesh with those of a smaller bevel pinion 14 carried by a substantially horizontal shaft 15 that is rotatably mounted in the top of the gear box 11 so as to extend parallel to the transverse length of the frame portion 1 and thus perpendicular or substantially perpendicular to the direction A. The gear box 11 is secured in position relative to the top of the hollow frame portion 1 by a support bar 12 of L-shaped cross-section that extends substantially parallel to the direction A, one limb of the bar 12 being bolted to the top of the frame portion 1 and the other limb thereof being bolted to one side of the gear box 11. The shaft 15 projects through the side of the gear box 11 that is remote from the support bar 12 and into the upper leading end of a transmission casing 16 that will be referred to again below. The shaft 15 passes through an opening in a substantially vertical side plate 17 that closes the adjacent end of the hollow frame portion 1 and it will be seen from FIG. 1 of the drawings that the opposite end of said frame portion 1 is also closed by a parallel substantially vertical side plate 17 that is of the same, or approximately the same, shape as the side plate 17 that can be seen in FIG. 2. A horizontal bearing housing that can be seen in broken lines in FIG. 1 of the drawings rotatably supports the shaft 15 alongside the neighboring side plate 17. The side plate 17 that adjoins the gear box 11 has upwardly convergent upper edges which meet at an apex point that is well above the top of the hollow frame portion 1 and just above the top of the gear box 11. The upright limb of the support bar 12, to which the gear box 11 is bolted, has a shape which matches that of the neighbouring frame portion side plate 17 and said limb and said side plate thus afford lateral protection to the gear box 11.

The transmission casing 16 is inclined downwardly and rearwardly (see FIG. 2) with respect to the direction A from its upper leading end and is turnable upwardly and downwardly about the axis of the shaft 15 next to the neighbouring frame portion side plate 17. A lower rear portion of the side plate 17 under discussion is formed with a row of holes 18 that are equidistant from the longitudinal axis of the shaft 15 and a lower portion of a rim of the transmission casing 16 is formed with a single hole that is at the same distance from said axis. A horizontal locking pin 19 or equivalent locking bolt is provided for entry through the single hole in the lower portion of the rim of the transmission casing 16 and a chosen one of the holes 18 to maintain the casing 16 in a corresponding angular position about the axis of the shaft 15. The end of the shaft 15 that projects into the hollow transmission casing 16 is provided with a sprocket wheel 20 around which passes an endless transmission chain 21. The transmission chain 21 also passes around a second sprocket wheel 22 that is located inside the casing 16 at substantially the lower rearmost end thereof. The second sprocket wheel 22 is secured to a substantially horizontal stub shaft 23 that passes through the same wall of the casing 16 as does the relatively parallel shaft 15, the stub shaft 23 being axially secured to one end of a central support 24 of a rotatable soil working tool 25. The tool 25 extends substantially horizontally parallel to the hollow frame portion 1 and thus perpendicular, or substantially perpendicular, to the direction A, the end of its central support 24 that is remote from the stub shaft 23 being provided with an axially coincident stub shaft that is rotatably journalled in a horizontal bearing carried by an arm 26. The arm 26 is turnable upwardly and downwardly alongside the frame portion side plate 17 (that is remote from the gear box 11) about a horizontal pivot 27 carried by said side plate 17 in axial alignment with the rotary shaft 15. Means that are not illustrated in the drawings but that are similar to the holes 18 and locking pin 19 are provided to retain the arm 26 in chosen angular positions about the common longitudinal axis of the shaft 15 and pivot 27.

The central support 24 of the tool 25 is provided with a plurality of substantially radially disposed blades 27A, each blade 27A being turnable relative to the support 24 about the axis of a corresponding pivotal shaft 28 that is in parallel relationship with the longitudinal axis of the support 24 and that is located close to that support. The blades 27A may, if desired, be made from resilient material and a study of FIGS. 1 and 2 of the drawing will show that, considered lengthwise along the central support 24, they are arranged in a helical row that is wound around the axis of that support, each blade 27A in the row being spaced by 90° about said axis relative to its immediate neighbour, or to both of its immediate neighbours, in the row. The transmission casing 16 and the arm 26 are perpendicularly interconnected at a location immediately in front of the tool 25 with respect to the direction A (see FIG. 2) by a tube 28A forming a support for the leading edge of a hood or baffle 29 that overlies an upper region of the rotary tool 25. As can be seen in FIG. 2 of the drawings, the hood or baffle 29 has a wall of which part is cylindrically curved in such a way that its axis of curvature substantially concides with the longitudinal axis and axis of rotation of the central support 24 but, towards its rear with respect to the direction A, the wall becomes flattened to extend substantially tangentially with respect to the circles that are traced by the tips of the blades 27A during rotation thereof, this relationship being as seen in FIG. 2 of the drawings. The rearmost extremity of said wall of the hood or baffle 29 is bent over upwardly to some extent (see FIG. 2).

Substantially horizontally aligned pivot pins 29A which are located at substantially the rearmost ends of the transmission casing 16 and of the arm 26, respectively, have support plates 28B whose shapes can be seen in FIG. 2 of the drawings turnably connected to them. The two support plates 28B are substantially vertically parallel to one another and to the direction A and are perpendicularly interconnected by a tubular supporting member 30 that is preferably, as illustrated, of circular cross-section but that is mounted, it will be realised, in a non-rotary manner. The tubular supporting member 30 extends parallel or substantially parallel to the longitudinal axis of the central support 24 of the tool 25 and to the transverse lenghth of the frame portion 1 and thus perpendicular or substantially perpendicular to the direction A. The tubular supporting member 30 is provided, at short but equal distances inwardly from its opposite ends, with pairs of upwardly directed lugs 31 whose upper ends are perpendicularly interconnected by pivot pins 32. The ends of arms 33, that are adjustable in length, are turnable about the substantially horizontal pivot pins 32 between the two lugs 31 of each pair and the opposite ends of said arms 33 are similarly connected by pivot pins 34, which are parallel to the pivot pins 32, to pairs of lugs 35 mounted on top of the hollow frame portion 1 at locations that in plan view are in register, in the direction A, with the pairs of lugs 32. It will be apparent that increasing or decreasing the lengths of the arms 33 will turn the tubular supporting member 30 either upwardly or downwardly about the pivot pins 29A relative to the transmission casing 16 and to the arms 26. Each arm 33 actually comprises two portions that can be fastened to one another in any chosen one of a number of different relative position which positions are such that the overall length of the arm 33 is different in each of them.

In the use of the soil cultivating implement that has been described with reference to FIGS. 1 and 2 of the drawings when used in combination with the rotary soil working tool 25, a coupling member or trestle 36, which is secured to the front of the frame portion 1 with respect to the direction A and which is of substantially triangular configuration as seen in front or rear elevation, is connected in the generally known manner that is illustrated in outline in FIG. 1 to the three-point lifting device or hitch at the rear of an agricultural tractor or other operating vehicle. The leading end of the substantially horizontal rotary input shaft 9 of the gear box 7 is placed in driven connection with the power take-off shaft of the same tractor or other operating vehicle by way of the known telescopic transmission shaft 10 having universal joints at its opposite ends. Before work commences, the change-speed gear 8 may require adjustment to give the speed of rotation of the members 3 that is appropriate to the nature and condition of the soil that is to be cultivated and to the purpose for which that soil is required after treatment. Moreover, the maximum depth to which the times 5 can penetrate into the soil may also require adjustment in the manner that will be discussed below before work commences. As the implement and tool combination moves in the direction A over land that is to be worked, the twelve rotary soil working or cultivating members 3 will revolve in the directions that are indicated by small arrows in FIG. 1 of the drawings which directions are, of course, such that each member 3 revolves in a direction which is opposite to that of its immediate neighbour or to those of both of its immediate neighbours. The effective working width of each member 3 is somewhat greater than is the preferred distance of substantially 25 centimeters between the axes of rotation of neighboring shafts 2 so that the twelve members 3 successively overlap one another to form a single broad strip of wroked soil. The soil working tool 25 will simultaneously revolve in the direction indicated by an arrow in FIG. 2 of the drawings by virtue of the drive that is transmitted to it from the gear box 7 by way of the change-speed gear 8, the pinions 6, the gear box 11, the shaft 15 and the transmission members that are contained within the casing 16, the speed of rotation of the tool 25 in response to a more or less fixed input speed of rotation to the gear box 7 also being dependent upon the particular transmission ratio that has been set in the change-speed gear 8. With the direction of rotation of the tool 25, its blades 27A move forwardly over the ground surface with respect to the direction of travel A and strike the upper surface of the soil that has just been worked by the immediately foregoing tines 5. In particular, any lumps of soil that are left lying upon the ground surface are struck by the blades 27A and will tend to break up along natural lines of fracture, it being remembered that the blades 27A may be of resilient formation and may even, if desired, be of a non-resilient flexible nature. The holes 18 that are chosen to co-operate with the locking pins 19 dictate the general level of the tool 25 and its supporting member 30 relative to the hollow frame portion 1 and this is the principal factor which determines the maximum depth of penetration of the tines 5 into the soil that is possible. Moreover, the arms 33 can be adjusted in length to turn the tubular supporting member 30 upwardly or downwardly about the axis defined by the pivot pins 29A and this adjustment dictates the vigour with which the blades 27A strike the ground surface since an alteration in the length of the arms 33 will either raise or lower the axis of rotation of the tool 25 relative to the ground surface. Depending upon the position of the supporting member 30 about the axis defined by the pivot pins 29A that is chosen, the supporting member 30 will exert a more or less gentle compressing effect upon the soil that has been crumbled by the members 3 and the tool 25 and will also level the worked soil to some extent, the implement/tool combination usually being able to produce an entirely satisfactory seed bed in a single traverse of the land.

FIGS. 3 to 5 of the drawings illustrate a soil cultivating implement in combination with a tool that is driven thereby, the soil cultivating implement being similar in many respects to the implement that has already been described with reference to FIGS. 1 and 2. Accordingly, parts that are similar, or identical, to previously described parts are indicated in FIGS. 3 to 5 of the drawings by the same references as have been employed in the preceding Figures. In the embodiment of FIGS. 3 to 5 of the drawings, those two shafts 2 which are the third shafts along the row thereof counting from its opposite ends have short upward extensions through the top of the hollow frame portion 1 into corresponding gear boxes 37. Each such shaft extension carries, inside the corresponding gear box 37, a large bevel pinion 38 whose teeth are in driving mesh with a smaller bevel pinion 39 secured to, or integral with, the leading end of a corresponding substantially horizontal shaft 40 that extends substantially parallel to the direction A. The rearmost end of each shaft 40 projects from the back of the corresponding gear box 37 and is there connected by universal joint 41 to one end of a telescopic transmission shaft 42. The opposite and rear end of the telescopic transmission shaft 42 is connected by a further universal joint 43 to the leading end of a substantially horizontal shaft 44 that extends substantially parallel to the direction A. The shaft 44 is rotatably mounted in a pair of substantially horizontal bearings 45 carried by a cylindrical housing 47 that is secured to the top of a corresponding support 46.

Each of the two supports 46 has the shape of an irregular truncated pyramid (see FIG. 3), the facing sides of the two supports 46 being rigidly interconnected by a tubular tie rod 49 that is substantially horizontally parallel to the hollow frame portion 1 and thus substantially perpendicular to the direction A. The bottoms of the two supports 46 are interconnected by two tubular supports 48 that are parallel to the tie rod 49 and in spaced apart relationship in the direction A. As will be evident from FIG. 3 of the drawings, the tubular supports 48 actually extend outwardly beyond the two supports 46 and throughout the working width of the members 3. The tubular supports 48 are interconnected at regular intervals, throughout substantially the whole of their lengths, by a plurality of strip-shaped elongated elements 50 whose general planes are substantially vertically disposed in substantially parallel relationship with the direction A, the lowermost edge of each element 50 having a slight convex curvature in a downward direction. It is preferred, but is not absolutely essential, that the elements 50 should be regularly spaced apart from one another by distances of substantially 3 centimeters.

The opposite ends of the tubular supports 48 are secured to rear portions of arms 51 which arms extend forwardly and upwardly from the tubular support 48 to have their upper leading ends pivotally connected to front portions of side or end plates 52 of the hollow frame portion 1 by substantially horizontally aligned stub shafts 64. The side plates 52 are substantially sector-shaped and, apart from their particular shape, are equivalent to the previously described side or end plates 17.

A spring mechanism that is generally indicated by the reference 53 is connected to each of the two arms 51 substantially midway along the length of that arm and comprises a rod 54 axially slidable through a hole in a guide plate 55 projecing perpendicularly from the upper edge of the corresponding arm 51. The lower end of each rod 54 carries an axially adjustable nut 56 and it will be seen from FIG. 4 of the drawings that each rod 54 is surrounded, between the corresponding guide plate 55 and nut 56, by a helical compression spring 57. The uppermost end of each rod 54 is connected to one limb of a corresponding right-angled support 58 whose other limb is coupled to the neighboring side plate 52 by a pivot bolt or the like 59 in a positionally adjustable manner. A plurality of holes 60 are formed in each side plate 52 at different levels close to the rearmost edge of that side plate and the pivot bolts or the like 59 can be entered through any chosen holes 60 to connect the right-angled supports 58 to said side plates 52 at the corresponding levels. A second helical compression spring 61 surrounds the upper part of each rod 54 between the upper surface of the corresponding guide plate 55 and the lower surface of the non-vertical limb of the corresponding support 58.

The ends of the shafts 44 that project behind the bearing housings 47 have corresponding weights 62 eccentrically secured to them. The two eccentric weights 62 are fastened to the shafts 44 with a phase difference of 180° between them as regards their eccentricity and, since the shafts 44 will revolve in opposite directions when the implement and tool combination is in use, the result is that substantially only vibratory movement of the elements 50 in substantially vertical directions is caused, movement in a substantially horizontal lateral direction (with respect to the direction A) that would tend to be caused by the motion of one of the two eccentric weights 62 being substantially wholly cancelled out by the opposing effect of the other eccentric weight 62.

In the use of the implement and tool combination of FIGS. 3 to 5 of the drawings, the coupling member or trestle 36 of the soil cultivating implement is connected to the three-point lifting device or hitch of an agricultural tractor or other operating vehicle and the input shaft 9 of the gear box 7 is placed in driven connection with the power take-off shaft of the same tractor or other vehicle by the known telescopic transmission shaft 10 that has been described above. In this embodiment, the strip-shaped elongate elements 50 and their support 48 together afford the working parts of a soil crumbling tool that is generally indicated by the reference 63, said tool 63 being rapidly vibrated in an upward and downward direction as a result of the fast rotation of the eccentric weights 62 in opposite directions. The arms 51 at the opposite ends of the soil crumbling tool 63 can turn upwardly and downwardly about the axis defined by the stub shafts 64 against the action of the opposed compression springs 57 and 61 of the spring mechanisms 53 which mechanisms 53 tend, it will be realized, to maintain the arms 51 in an equilibrium position corresponding to one particular angular setting about the axis defined by the stub shafts 64 for each possible level of the pivot bolts or the like 59 relative to the side plates 52. The rapid upward and downward vibratory movement of the soil crumbling tool 63 crumbles and levels the lumps of soil that are produced by the immediately foregoing tines 5 of the members 3 and the implement/tool combination can usually produce a substantially flat, well crumbled and homogeneous bed that is ready for the sowing of seeds in a single traverse of the soil. As in the previous embodiment, the soil crumbling tool 63 also serves the additional function of a supporting member of the leading soil cultivating implement since it will be realised that its level relative to that of the hollow frame portion 1 is dictated principally by the particular holes 60 that are chosen for co-operation with the pivot bolts or the like 59 and that the chosen level governs the maximum depth of penetration of the tines 5 into the soil which is possible. If desired, the shafts 44 may be extended further rearwardly and one or both of their rearward extensions may be used to drive moving parts of at least one further tool or implement that is to be further combined for use with the soil cultivating implement and the soil crumbling tool 63. This is equally true of the embodiment of FIGS. 1 and 2 of the drawings where the shaft 15 may be extended beyond the transmission casing 16, the extension being arranged to drive moving parts of at least one further tool or implement that is also to be used in combination with the soil cultivating implement and the rotary soil working tool 25.

Although certain features of the soil cultivating implement/tool combinations that have been described and/or that are illustrated in the accompanying drawing will be set forth in the following claims as inventive features, it is emphasized that the invention is not necessarily limited to those features and that it includes within its scope each of the parts of each soil cultivating implement/tool combination that has been described, and/or that is illustrated in the accompanying drawings, both individually and in various combinations.

What I claim is:

1. A cultivating implement comprising a frame and a row of cultivating members rotatably mounted on corresponding upwardly extending shafts journalled in a portion of said frame, a coupling member at the forward portion of said frame connectable to a prime mover and transmission means engaging said cultivating members to rotate same about axes defined by said shafts, an elongated, movable crumbling member pivoted to said frame at the rear of said row, said crumbling member being driven by further transmission means interconnectd to at least one of said shafts and tool means on said crumbling member being driven to further work soil previously worked by the cultivating members, an elongated supporting member positioned to the rear of said crumbling member and said supporting member being positioned to bear on the ground, said crumbling member and said supporting member being pivotably interconnected to one another and means retaining each of the members in a number of chosen positions relative to the other and to said frame to regulate the working depths of said cultivating members and the soil working effect of said tool means.

2. An implement as claimed in claim 1, wherein said crumbling member is pivoted to the frame by arm means, means adjusting the level of the crumbling member to a number of different positions with respect to said frame portion independently of said supporting member.

3. An implement as claimed in claim 2, wherein said supporting member is pivoted to said arm means and further adjusting means interconnects the supporting member to the frame, whereby the level of said supporting member relative to said crumbling member can be altered.

4. An implement as claimed in claim 3, wherein said supporting member comprises an elongated tube, the ends of said tube being pivoted to said arm means adjacent the rear end thereof.

5. An implement as claimed in claim 2, wherein said crumbling member is driven by a driving shaft and said driving shaft forms a front substantially horizontal pivot for said arm means.

6. A cultivating implement comprising a frame and a row of cultivating members rotatably mounted on corresponding upwardly extending shafts journalled in a portion of said frame, a coupling member at the forward portion of said frame connectable to a prime mover and transmission means engaging said cultivating members to rotate same about axes defined by said shafts, an elongated rotatable crumbling member pivoted to said frame at the rear of said row, said crumbling member being driven by a further transmission interconnected to said first mentioned transmission means and at least one tool of said crumbling member being driven to further work soil previously worked by the cultivating members, an elongated supporting member being positioned to the rear of said crumbling member and said supporting member extending substantially parallel to the crumbling member, said supporting member being pivoted to the crumbling member and linked to said frame portion, and means retaining said supporting member at a number of chosen level positions relative to said crumbling member and to the frame to alter the working effect of the former, said crumbling member being pivotable about a substantially horizontal axis defined by a shaft of said transmission means and means fixing the level of said crumbling member relative to the cultivating members about said axis.

7. An implement as claimed in claim 6, wherein a baffle surrounds the upper portion of said crumbling member and said baffle is mounted on an adjustable support which is displaceable relative to the frame together with said crumbling member.

* * * * *